Dec. 23, 1930.   J. H. PHILLIPS   1,786,029
TOOL HOLDER
Filed Nov. 24, 1924
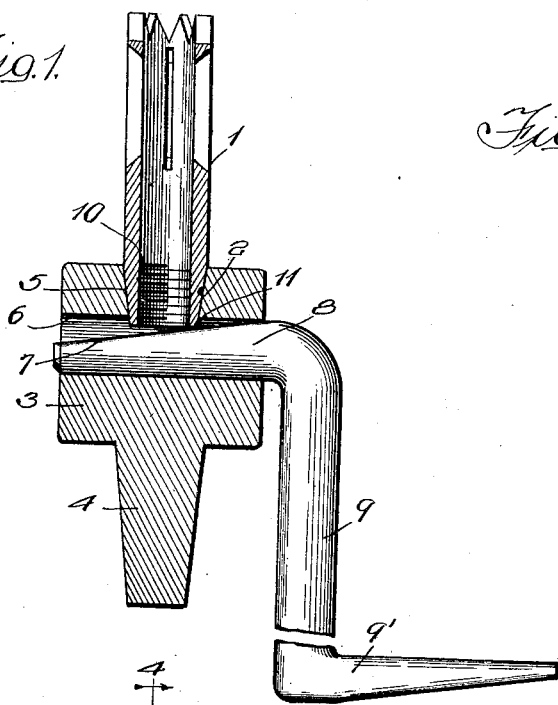
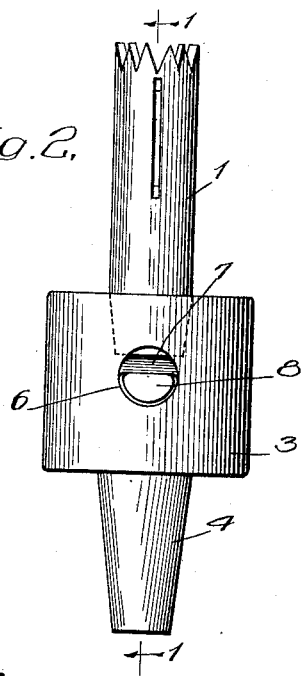
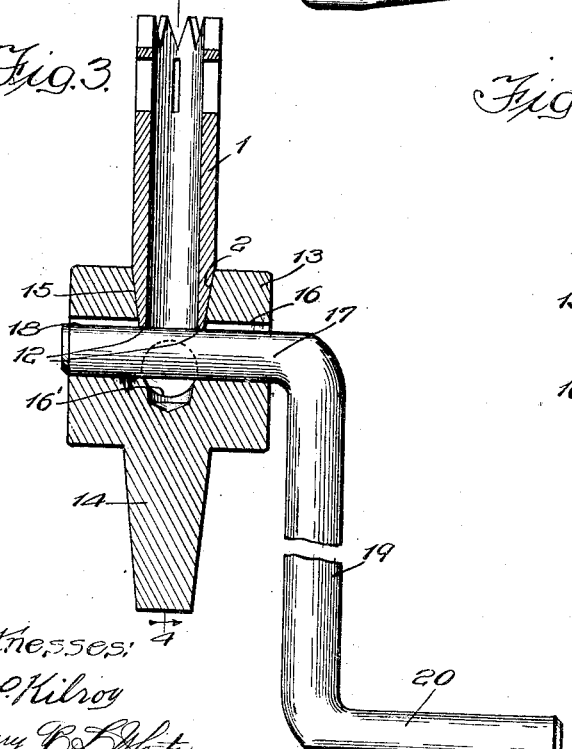
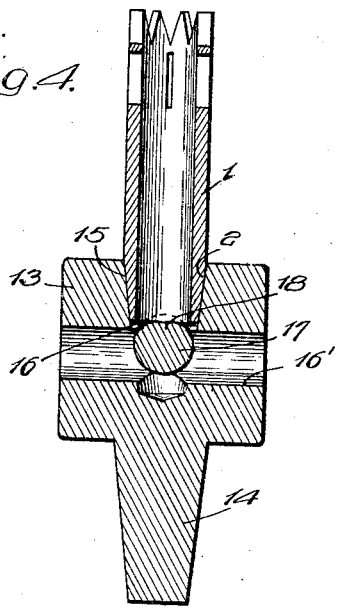
Witnesses:
W. P. Kilroy
Harry B. White
Inventor:
John H. Phillips
By
Attys.

Patented Dec. 23, 1930

1,786,029

UNITED STATES PATENT OFFICE

JOHN H. PHILLIPS, OF CHICAGO, ILLINOIS

TOOL HOLDER

Application filed November 24, 1924. Serial No. 751,896.

My invention belongs to that general class of devices known as tool holders or chucks, and relates more particularly to a chuck for holding drills and adaptable for use in connection with spring, pneumatic, electrical, or other hammers. The same is particularly adapted for use with tubular drills, particularly where the drill is a combined expansion or anchoring shell and drill. The invention has among its objects the production of a device of the kind described which is simple, convenient, compact, durable, reliable, efficient and satisfactory for use wherever found applicable. It has as a further object the production of a holder that will permit the discharge of the drilled-out material from the drill and chuck without stopping the drilling or requiring the removal of the tool from the hole or from the holder. It has particularly as an object the production of a tool holder or chuck from which the drill or other tool may be quickly and conveniently removed from the holder, and a removing tool for use therewith. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional view through my improved device, with one type of tool or shell inserted, the same being taken substantially on line 1—1 of Fig. 2;

Fig. 2 is a side elevation of the same;

Fig. 3 is a view similar to Fig. 1 of another form of the device; and

Fig. 4 is a sectional view taken substantially on line 4—4 of Fig. 3.

Referring to the drawings, in which the preferred embodiment of the invention is shown, 1 represents one type of tool adapted to be employed and held by my improved holder, the particular tool shown consisting of a tubular combined drill and expansion shell. It should be understood that the particular tool or drill shown represents any type and is intended more particularly to illustrate the construction and use of the chuck. This particular shell is provided with cutting faces or teeth at one end and arranged for expansion thereat, while the opposite or chuck end is preferably tapered as indicated at 2. The chuck or tool holder proper consists of a head 3 provided with a shank 4 or the equivalent for attachment to a suitable tool, such as a hammer, it being immaterial just what type of hammer is used, whether spring, pneumatic or the like. Of course, the shank 4 will be constructed to fit the particular style or type of hammer for which my improved device is adapted to be used, a tapered shank being shown.

The head 3 is provided with a tapered recess or socket 5 arranged to receive the end of the tool 1, its shape depending on the tool shape at its end. In driving or feeding the tool, the same fits snugly in the socket and may and does in many instances become so firmly seated that it is sometimes difficult to remove it. It is also often inconvenient to remove the chuck or separate the chuck and tool after the drill has been expanded into the hole and anchored therein. In the drawings, I have shown two similar means provided for positively and forcibly separating the tool from the chuck.

Referring first to Figs. 1 and 2, 6 represents an opening extending through the head transversely to the axis of the socket and so disposed that the same cuts the socket or intercepts it. The same is preferably so positioned that normally when the tool 1 is seated and regardless of slight variations in the tool sizes the end of the tool will project into the opening 6 to a slight extent. During the drilling operations the drillings can flow out through the socket and opening 6, keeping the drill clean. Insertable in the opening is a tool removing member 8 which is preferably provided with a flat face 7. I prefer to provide a round or cylindrical hole 6 and a cylindrical member 8, member 8 being rotatable in the opening. As shown, the flat face 7 tapers, the end which is first inserted being reduced. Member 8 is preferably provided with the handle portion 9 so as to afford leverage in turning or rotating the portion 8 in the hole or opening, and may have the offset handle portion 9', similar to 8, but of a different size if desired. After the drilling or expanding operation, when it is desired to separate the tool from the chuck, member 8 is inserted until the flattened portion 7 engages the tool, after which the member 8 is turned in one direction or the other and the same turns or rolls under the projecting end of the tool substantially as a cam. Obviously (see Fig. 2), as the member is turned, the same positively pushes or lifts the tool sufficiently to break the frictional engagement of the parts so that the tool may be easily removed out of the socket in which it may be firmly seated. I prefer to slightly round the edges at the flattened portion as shown. This particular type of tool engages more or less at one edge of the drill or tool, and while in many cases this is satisfactory, in some instances where the shell or drill is threaded internally as indicated at 10, the same is comparatively thin at its extreme edge. Ordinarily, no injury, however, will be done to the thread or to the drill at the end, and this type is generally very satisfactory.

In Figs. 3 and 4, I have illustrated a type or construction in which the tool or drill is engaged at opposite sides and the pressure exerted at both sides rather than at only one point. Referring to these figures, I have shown a similar drill 1 tapered at the end as indicated at 2. The chuck or holder consists of a similar head 13 and shank 14, and the same is provided with a tapered recess or socket 15 for receiving the tool. I have shown this chuck provided with a plurality of transverse openings or holes 16 and 16' extending through the head and substantially intercepting the socket. There may be one, two, or more of such openings, but they are so arranged that adjustment of the removing instrument in the different holes gives different effects and allows for variation in the sizes of the drills. By making the transverse hole or holes 16' of substantially the same or slightly smaller diameter than the socket 15, the hole 16' is always available as a cleaning opening through which cores from the drill may escape. It is of advantage to provide the hole 16 of a predetermined diameter in the chuck independently of the diameter of the socket or of the hole 16', as thereby a single tool lifting member 17 may be utilized with different chucks. The removing member, 17 in this case, is shown provided with a flat face 18 extending substantially parallel with the axis, the hole in 13 being parallel to the construction previously described. I have shown member 17 provided with a handle 19, and the same may also have a portion 20 corresponding to 17, except that the same will be somewhat thinner.

In removing a drill or tool from the chuck, 17 is inserted in the proper hole so that it may be easily insertable without interference with the drill, after which upon turning the same, it engages at two points 12 on the drill and lifts or forces the same out, as in the tool previously described. If the shell is a trifle longer than the one shown in Fig. 3, so that 17 is not easily insertable, the portion 20 or reduced thickness may be inserted with the same results described. If, however, the tool or drill is so held that neither 17 or 20 may be inserted, then one or the other may be inserted in the other hole or opening 16', which as shown, is a trifle lower, these holes or openings being so arranged that insertion of the tool in one or the other will clear the inserted end of the tool when inserted but permit the engagement when the remover is turned. As before mentioned, there may be any number of openings corresponding to 16, varied in their location to afford the different adjustments.

From the preceding, it will be seen that the tool, regardless of how tightly wedged in its socket, may be quickly and conveniently, as well as easily separated from the chuck. This is particularly desirable when after drilling the hole the drill is then expanded in the hole, constituting an anchor or expansion shell. The chuck in reality is a socket provided with one or more key holes and arranged to discharge through the holes which are of a size to permit free passage of the drillings as well as to receive the key. The key, rather than a wedge, is a rotatable cam-shaped key which in the preferred form is provided with a handle for convenience in rotating the same. The types of drills or shells vary, the same being arranged for hanging or supporting various things in various manners. I have found, however, that the device herein described is adapted for various tools or shells, regardless of how they are constructed for fastening purposes, the same affording a positive disengagement of the drill or shell without in any way injuring or deforming the drill. While the socket 5 or 15 is shown to engage a cylindrical tool, obviously the contour of the socket and design would depend upon the particular tool to be carried in the chuck. With both types of holder shown, the drill is kept clean of the drilled-out material. The particular handled remover or key shown is convenient and powerful, and permits great force to be applied without injuring the drill or tool. It may be conveniently carried by the worker.

Having thus described my invention, it is obvious that various immaterial modifications may be made in the same without de- parting from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a tool holder arranged for attachment to a cooperating part and provided with a tapered tool-receiving recess, said holder provided with an opening extending transversely therethrough disposed to intercept said recess, and a crank-shaped tool-removing member insertable through said opening and rotatable therein, said tool-removing member provided with a flat cam face at one side thereof and rounded over at the edges.

2. In a device of the kind described and in combination, a chuck consisting of a head provided with a tapered socket and with a transverse opening positioned to intercept the inner end of the socket, and an integral tool-lifting member insertable in said opening and having means thereon for rotating same, said tool member having a cam face comprising a longitudinally extending inclined plane whereby the member is insertable in the opening to clear the tool but engageable with the tool upon partially rotating the member in the opening.

3. In a device of the kind described and in combination, a chuck provided with a tool socket and with an opening extending transversely the axis of the socket and intercepting the same, and an integral tool engaging instrument insertable in said opening and operative upon a turning movement about the axial line of said opening to directly engage and separate the tool and chuck.

In testimony whereof, I have hereunto signed my name.

JOHN H. PHILLIPS.